Feb. 17, 1953
M. C. ROBINSON
2,628,696
ELECTRICAL CIRCUIT FOR A TRANSMISSION
AND CLUTCH CONTROL APPARATUS
Filed Oct. 18, 1947
2 SHEETS—SHEET 1
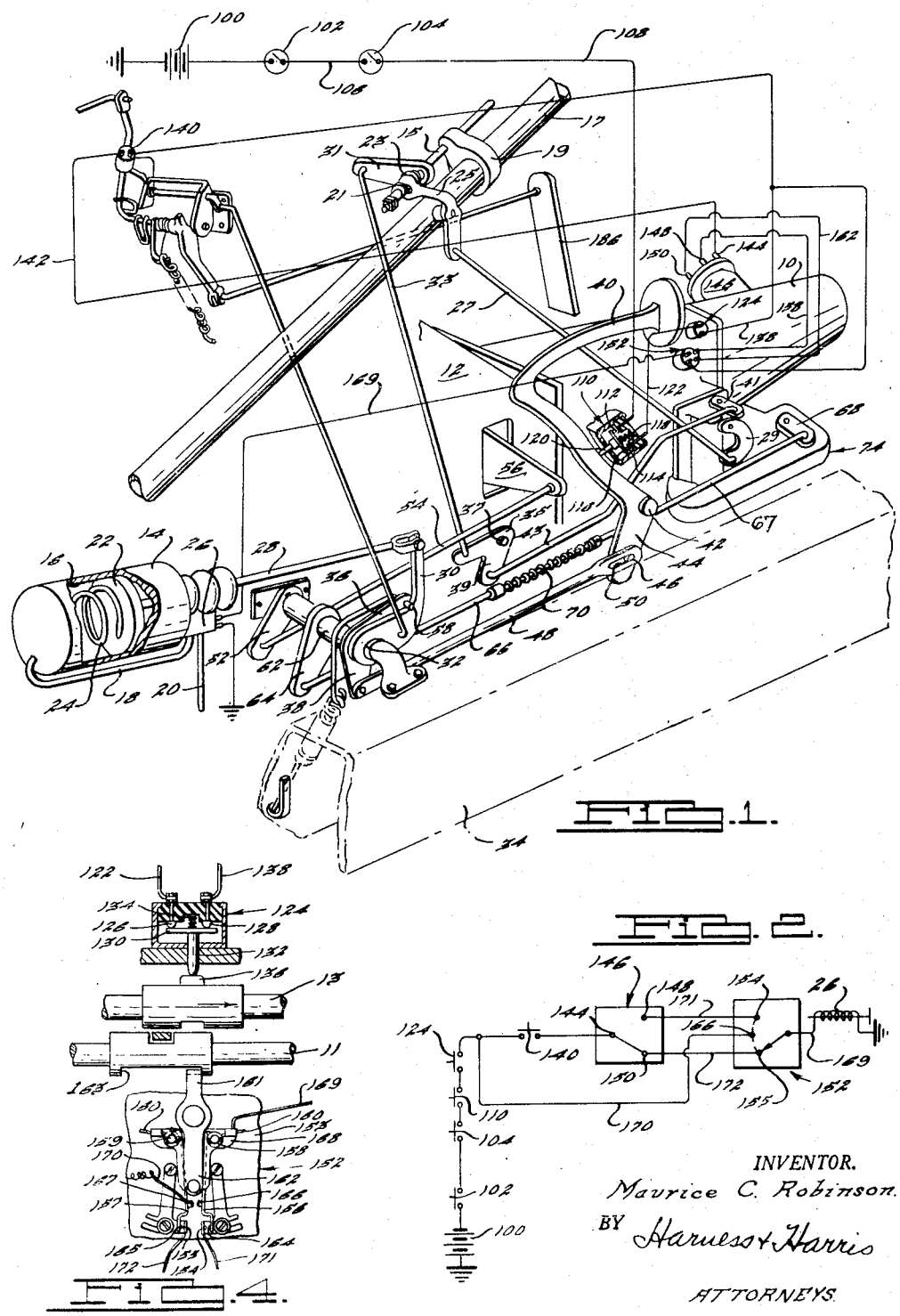
INVENTOR.
Maurice C. Robinson.
BY Harness+Harris
ATTORNEYS

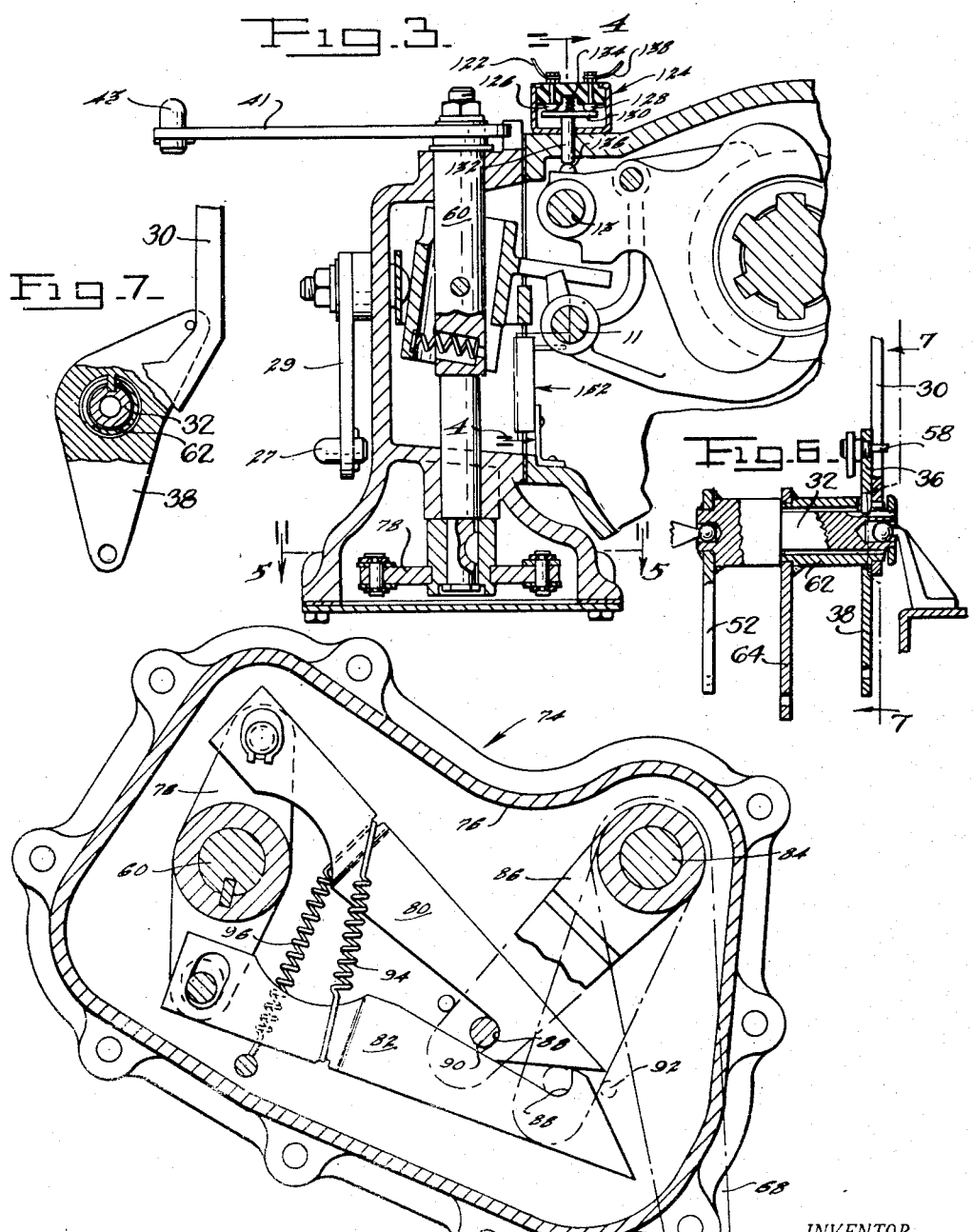

Patented Feb. 17, 1953

2,628,696

UNITED STATES PATENT OFFICE 2,628,696

ELECTRICAL CIRCUIT FOR A TRANSMISSION AND CLUTCH CONTROL APPARATUS

Maurice C. Robinson, Royal Oak, Mich., assignor to Chrysler Corporation, Highland Park, Mich., a corporation of Delaware Application October 18, 1947, Serial No. 780,718

10 Claims. (Cl. 192—.073)

This invention relates to an electrical circuit for a transmission and clutch control apparatus.

A control system for a clutch and transmission used in conjunction with a conventional fluid coupling was described in the copending application, Serial No. 755,612, filed June 19, 1947 by Maurice C. Robinson. The present invention provides an improved electrical circuit for the control system described therein, and more particularly provides means for the operator to operate the clutch and change the transmission speed ratio drive without operating a selector switch provided to energize the automatic control apparatus. The automatic control system is inactivated as an incident to manual operation of the clutch pedal and manual movement of the transmission shift rail.

It is a principal object of the invention to associate switches with the clutch pedal and transmission components so that the vehicle driver by the act of depressing the clutch pedal and manually changing the transmission speed ratio drive inactivates the automatic control system during the interval of manual operation of the clutch and transmission.

It is a further object of the invention to provide means which will permit the automatic control system to resume operation as an incident to the discontinuance of manual operation of the vehicle.

Other objects and advantages of the invention will be apparent from the following description taken in connection with the accompanying drawings, in which:

Fig. 1 is a perspective view of a clutch and transmission control apparatus incorporating my invention;

Fig. 2 is a circuit diagram of the electrical circuit used in the Fig. 1 control apparatus;

Fig. 3 is a vertical section of a portion of the mechanism carried by the transmission housing;

Fig. 4 is a section on the line 4—4 of Fig. 3;

Fig. 5 is a section on the line 5—5 of Fig. 3;

Fig. 6 is a partial section of the torque shaft and its associated levers shown mounted on the vehicle frame in Fig. 1; and Fig. 7 is a section on the line 7—7 of Fig. 6.

The control mechanism to be described herein is adapted to actuate a transmission of the type illustrated in Patent No. 2,284,191 and a conventional friction clutch. Fig. 3 illustrates the relationship of the control mechanism to the transmission.

The control system to be described is particularly adapted for use in conjunction with a friction clutch and transmission when they are associated with a fluid coupling. The relation of the fluid coupling to the control system is described in the copending application, Serial No. 661,298, filed April 11, 1946 by Carl A. Neracher et al.

A motor vehicle transmission 10 has a conventional friction clutch 12 operatively associated therewith as illustrated in Fig. 1. An automatic control mechanism is associated with the transmission and clutch and adapted to control the operation thereof in response to predetermined vehicle operating conditions. The automatic transmission control mechanism is superimposed on a manual control of the type described in Patent No. 2,284,191. The selector mechanism described in the above patent is normally in engagement with one of the shift rails. This shift rail is designated by the numeral 11 in the drawings herein. The other shift rail which controls low and reverse transmission drives has been designated by the numeral 13. The automatic control apparatus to be described herein only actuates the selector mechanism to move the shift rail 11 and does not engage the selector mechanism with the other shift rail 13. Therefore, the discussion herein of an automatic control mechanism will be directed to means to selectively rotate the vertical control shaft of the transmission in opposite directions and thereby move the one shift rail in opposite directions. This rotation of the control shaft will create a relatively fast or a relatively slow speed ratio drive depending upon the direction of movement of the shift rail. For reasons of simplicity this will be referred to herein as effecting a change in the speed ratio drive between that which is commonly referred to in a conventional transmission as a second speed drive and that which is commonly referred to as direct drive. It is to be understood, however, that the movements of the control apparatus could effect any other change in speed ratio drive desired.

A manual shift control rod 15 is shown in Fig. 1 as associated with the steering column housing 17. The manual shift control rod 15 is slidably mounted in bracket 19 and adapted for both axial and rotary movement. As is usual in the art, the axial movement is adapted to select the transmission shift rail which is to be moved and rotation of the shift control rod 15 rotates transmission control shaft 60 which will be described herein. This effects the desired transmission speed ratio drive connection. A pair of spaced circumferential collars 21 and 23 located adjacent the base of rod 15 receive therebetween the end of a lever 25 which is rotatably mounted on the steering column housing 17. A rod 27 connects lever 25 with a transmission selector lever 29. Axial movement of rod 15 is transmitted through this linkage to the selector lever 29. The function of the selector lever 29 is described in Patent No. 2,284,191.

An arm 31 is keyed to rod 15. A depending rod 33 connects arm 31 with a rotatable lever 35 mounted at 37. An arm 39 of lever 35 is connected to a transmission shift lever 41 through rod 43. Rotation of rod 15 through the linkage just described rotates shift lever 41 for manual transmission control. The relation of shift lever 41 to the transmission 30 described in Patent No. 2,284,191.

The automatic control apparatus is powered by a piston adapted to be actuated under selected vehicle operating conditions by manifold vacuum. An airtight housing 14 containing a cylinder 16 has tubular connections 18 and 20 with the engine intake manifold. A piston 22 is slidably mounted in cylinder 16 and a spring 24 acting on piston 22 and reacting on housing 14 urges piston 22 to one end of cylinder 16. A solenoid actuated valve 26 is positioned between the tubular connections 18 and 20 and adapted when energized to operatively connect the tubular connections 18 and 20 so that air will be evacuated from the cylinder 16 by the intake manifold vacuum of the engine. The solenoid operated valve 26 is also adapted to vent cylinder 16 when it operatively disconnects tubular connections 18 and 20. Manifold low pressure, or vacuum as it is commonly referred to, by evacuating air from cylinder 16 overcomes spring 24 when valve 26 is open thereby moving the piston 22 to the left in Fig. 1. A piston rod 28 connects the piston 22 with an arm 30 which is rotatably mounted on a torque shaft 32. The torque shaft 32 has one end thereof rotatably mounted on the vehicle frame 34 and the other end rotatably mounted adjacent the engine block (not shown) in a manner well known in the art. The torque shaft and its associated levers are illustrated in detail in Figs. 6 and 7. A lever 36 keyed to shaft 32 is provided with a depending arm 38. The usual clutch pedal 40 is rotatably mounted at 42 on a shaft (not shown). An extension 44 of clutch pedal 40 depends below rotatable mounting 42 and has fixed thereto a pin 46. A rod 48 operatively connects arm 38 with pin 46. A slot 50 provided in rod 48 permits relative movement in one direction between rod 48 and pin 46. The upper end of lever 36 may be operatively associated with the usual over center clutch spring. An arm 52 is keyed to torque shaft 32. A rod 54 connects arm 52 with clutch throwout fork 56. Clutch throwout fork 56 engages a collar and operates a friction clutch 12 in a manner well known in the art. A typical clutch is illustrated and described in Patent No. 2,182,407. The lever 36 previously referred to is provided with a pin 58 which is adapted to be engaged by the arm 30 when the latter is rotated in a counterclockwise direction in response to movement of piston 22 under the influence of manifold vacuum. When the solenoid actuated valve 26 is energized and the piston 22 moved to the left in Fig. 1 piston rod 28 rotates arm 30 in a counterclockwise direction. Arm 30 engages and carries therewith the pin 58 associated with lever 36 thereby rotating the lever 36. The lever 36 is keyed to the torque shaft 32 and the torque shaft 32 is thus rotated. Rotation of the shaft 32 rotates the arm 52 which is keyed thereto. This pushes rod 54, rotates clutch throwout fork 56 and disengages the clutch 12. The rotation of the lever 36 and the depending arm 38 in this counterclockwise direction does not cause a depression of the clutch pedal 40 because of the cooperation of the slot 50 in rod 48 and the pin 46. This pin and slot combination permits movement of rod 48 to the right in Fig. 1 without an accompanying depression of clutch pedal 40. When solenoid actuated valve 26 closes the operative connection between tubular connections 18 and 20 and vents the cylinder 16, spring 24 returns the parts described in their original position permitting the clutch to reengage under the influence of its own self contained springs.

The movement of piston 22 also effects a change in transmission speed ratio drive by rotating the vertical control shaft 60. Reference may be made to Patent No. 2,284,191 for further description of the means by which rotation of shaft 60 effects a change in the transmission speed ratio drive. The torque shaft 32 is provided with a collar 62 which is rotatably mounted thereon. An arm 64 is keyed to collar 62. A lever 68 is provided on a motion translating device 74 to be described herein and a pair of rods 66 and 67 are operably connected by a resilient lost motion connection 70 and respectively connected to arm 64 and lever 68. The resilient connection 70 cushions the motion of lever 68 in response to sudden movement of piston 22. The arm 30 is keyed to collar 62. Movement of the piston 22 is repeated by arm 68. As the piston 22 moves to the left in Fig. 1 the piston rod 28 rotates arm 30 in a counterclockwise direction. Rotation of collar 62 in a counterclockwise direction rotates lever 64 and moves rod 66 to the right in Fig. 1 thereby rotating the arm 68 in a counterclockwise direction. When the solenoid actuated valve closes and vents cylinder 16 the spring 24 returns piston 22 to the right end of housing 14 and moves arm 68 in a clockwise direction.

The arm 68 is adapted to actuate a motion translating device generally designated by the numeral 74. The device 74 is adapted to translate successive counterclockwise rotations of arm 68 to alternate counterclockwise and clockwise rotations of transmission control shaft 60 (Figs. 3 and 5). The device 74 is mounted in a housing 76 secured to the lower portion of the housing containing transmission 10. A lever 78 has a central portion thereof keyed to the transmission control shaft 60. A pair of fingers 80 and 82 are each rotatably mounted on lever 78 on opposite ends thereof. The arm 68 previously referred to is keyed to a shaft 84 which is mounted in the housing 76. The arm 68 and shaft 84 are rotated in response to movement of the piston 22 in the vacuum cylinder. An arm 86 is keyed to shaft 84 inside of the housing 76. The fingers 80 and 82 are each provided with a recessed portion 88 adapted to receive a pin 90 which is carried by the end portion of arm 86. In operation the pin 90 moves between the fingers 80 and 82. Rotation of the arm 86 in a counterclockwise direction from the solid line position illustrated in Fig. 5 will cause the pin 90 to engage and pull one of the fingers to the right as viewed in Fig. 5 to thereby rotated lever 78 and shaft 60. The direction of rotation of shaft 60 will be dependent upon whether finger 80 or 82 was moved by pin 90. The direction of rotation of shaft 60 will determine the speed ratio drive to be effected by the transmission 10. Rotation of arm 86 in a clockwise direction in Fig. 5 is used to index the arm 86 relative to the fingers 80 and 82. The next succeeding counterclockwise movement of arm 86 will pull the other finger and reverse the rotation of shaft 60 thereby effecting a change in the transmission speed ratio drive. Movement of piston 22 under the influence of vacuum causes the counterclockwise rotation of arm 86 and the spring return of piston 22 causes the clockwise rotation of lever 86. An abutment in the form of a pin 92 may be provided to limit the rotation of arm 86 in a counterclockwise direction in Fig. 5. This retains the pin 90 between the fingers. A spring 94 urges the fingers together. A spring 96 is used to bias the alternator as explained in the copending application, Serial No. 755,612 filed June 19, 1947, by Maurice C. Robinson.

Means to control the actuation of the valve 26 and piston 22 is illustrated in Figs. 1 and 2. A grounded source 100 of electric energy is connected through ignition switch 102 to a switch 104 by an electrical conductor 106. Switch 104 is adapted to provide a selection between manual and automatic operation of the clutch and transmission and may be placed on the dash or other location convenient to manipulation by the driver of the vehicle. Electrical line 108 connects switch 104 with a switch 110 associated with the clutch pedal 40. The switch 110 includes contacts 112 and 114 which are electrically connected by a conductor 116 when the clutch pedal is in the position corresponding to clutch engagement. A spring 118 urges the conductor 116 away from contacts 112 and 114 when the clutch pedal 40 is depressed thereby breaking the electrical circuit between contacts 112 and 114. When the clutch pedal 40 returns to its upper position it engages a plunger 120 carried by conductor 116 and overcomes spring 118 thereby making an electrical circuit between contacts 112 and 118. The electrical line 108 is connected to contact 112. The contact 114 is connected to a line 122. A switch 124 is associated with shift rail 13 and adapted to be closed only when the shift rail 13 is in its neutral position. When shift rail 13 is moved away from this position to accommodate either a low or a reverse drive the switch 124 is opened. The electrical line 122 is connected to a contact 126 contained in switch 124. A second contact 128 is provided. A conductor 130 electrically connects contacts 126 and 128. A plunger 132 and spring 134 are associated with the conductor 130. An abutment 136 on shift rail 13 is adapted to engage plunger 132 and overcome spring 134 and force conductor 130 into engagement with contacts 126 and 128 only when shift rail 13 is in its neutral or mid position. When the rail 13 is moved either to the left or to the right from its Fig. 4 position to effect a change in transmission speed ratio drive the switch 124 is opened. Contact 128 has connected thereto an electrical line 138 which connects switch 124 with a switch 140 adapted to be closed when the throttle is substantially closed. Line 142 connects switch 140 with the inlet terminal 144 of a vehicle speed responsive governor 146. The governor is provided with outlet terminals 148 and 150 and is adapted to electrically connect terminal 144 with the terminal 148 below a predetermined vehicle speed and to electrically connect the terminal 144 with the terminal 150 above this predetermined speed. A switch 152 is adapted to be actuated by movement of the shift rail 11 in the transmission. This switch 152 comprises a backing plate 153 having a pair of spaced stationary contacts 154 and 155 secured thereto. A pair of depending arms 156 and 157 are pivotally mounted at 158 and 159 on plate 153 and adapted to straddle the contacts 154 and 155. The arms 156 and 157 are urged toward each other by springs 160 associated therewith. An actuating member 161 is pivotally mounted on plate 153 and has a portion 162 thereof received between the arms 156 and 157. The shift rail 11 is provided with a slot 163 adapted to receive the other extremity of the member 161 so that a lost motion connection is provided between the shift rail and the member 161. Movement of the shift rail 11 causes a rotation of member 161 and rotation of the arms 156 and 157. Arm 156 is provided with a contact 164 adapted to engage contact 155. Arms 156 and 157 are provided with cooperating contacts 166 and 167 which are adapted to engage each other when the arms are unrestricted in their movement toward each other. The contact 167 is insulated from arm 157. The contact 166 is electrically connected to arm 156. The arms 156 and 157 are electrically connected to a bar 168 which is connected with the solenoid operated valve 26 by a line 169. A line 170 interposed in the circuit of Fig. 2 between the switch 124 and switch 140 is connected to the terminal 167 on arm 157. A line 171 electrically connects the terminal 148 of the speed responsive governor to the stationary contact 154 of the rail switch 152. A line 172 connects terminal 150 of the speed responsive governor to the stationary contact 155 of the rail switch 152. When the shift rail 11 is in its direct drive position which is shown in Fig. 4 an electrical connection is provided between the line 172 from the speed responsive governor to the line 169 connected to the solenoid operated valve 26. This connection extends from line 172 through contact 155, contact 165, arm 157, bar 168 to line 169. It should be noted that the movement of the shift rail 11 to the left in Fig. 4 caused the member 161 to be pivoted in a counterclockwise direction thereby moving the arm 156 away from the contact 154 and leaving the arm 157 free to be rotated in a counterclockwise direction by the spring 160 until its rotation was stopped by the engagement of the contact 165 with the stationary contact 155. When a change in speed ratio drive is effected by the movement of the shift rail 11 to the right in Fig. 4, the member 161 is released by the notch 163 in the shift rail 11. This permits the arms 156 and 157 to move toward each other under the influence of springs 160 until the contacts 166 and 167 are in engagement. During this interval in which the piston 22 and shift rail 11 are in motion a circuit is provided through line 170, contact 167, contact 166, arm 156 and line 169 to shift solenoid valve 26. When the other extremity of the slot 163 in the shift rail 11 engages member 161 to rotate it in a clockwise direction the contact 164 engages contact 154 and rotation of the arm 156 is thereby prevented. The rotation of member 161 moves arm 157 out of operative engagement with contacts 166 and 167 so that the only contact remaining in engagement when the shift rail is at its extreme position to the right in Fig. 4 is made by the contacts 154 and 164. A circuit is provided thereby from line 171 through contacts 154, 164, arm 156, bar 168 and line 169 to the shift solenoid valve 26.

Referring to Fig. 2 the operation of the electrical circuit thus far described will be explained. In operation, the driver of the vehicle closes the ignition switch 102 as an incident to operation of the vehicle. If the driver wishes the automatic control mechanism described herein to effect for him changes in transmission speed ratio drive he so designates by closing switch 104 on the dash. When the vehicle is operating and the driver desires that a shift or change in speed ratio drive be effected he so signals by releasing his foot from an accelerator pedal 186 thereby closing switch 140. It will be noted that the switches 110 and 124 are normally in their closed position. The governor terminal 144 has been illustrated in Fig. 2 as electrically connected with the terminal 150. This indicates that the vehicle speed is low and the lower speed ratio drive desired. Electricity from the grounded storage battery 100 thus passes through the closed switches 102, 104, 110, 124, 140 and through the terminal 144 to the terminal 150. If the vehicle is at that time operating in direct drive the shift rail 11 is in the left hand position in Fig. 4. The contacts 155 and 165 of the rail switch 152 are therefore closed and line 172 operatively connected with line 196. The grounded solenoid actuated valve 26 is thereby energized. The energization of valve 26 exposes the cylinder 16 to the intake manifold of the engine thereby moving piston 22 to the left in Fig. 1 to disengage the clutch 12 and to rotate transmission control shaft 60. Rotation of shaft 60 moves the shift rail 11 to the right in Fig. 4 to effect a lower speed ratio drive. The movement of the shift rail 11 to the right opens contacts 155 and 165 of rail switch 152 and when the other speed ratio drive is effected by movement of the shift rail 11 to the extreme right the contacts 154 and 164 are closed thereby connecting lines 171 and 169. As long as the vehicle speed remains below the predetermined governor speed the circuit is broken by the governor 146 and valve 26 deenergized. When the circuit is broken and the solenoid actuated valve 26 deenergized piston 22 is moved to the right in Fig. 1 by spring 24. This indexes the arm 86 of the motion translating mechanism of Fig. 5 and permits the clutch 12 to reengage. During normal operation of the vehicle the driver will then depress the accelerator pedal 186 thereby opening switch 140. If the vehicle should then accelerate sufficiently so that the predetermined speed of the governor is exceeded the terminal 144 thereof will be electrically connected with the terminal 148. Since the vehicle is operating in its lower speed ratio drive with the shift rail 11 moved to the right in Fig. 4 the contacts 154 and 164 are closed. If under these conditions the operator releases the accelerator pedal 186 and the switch 140 is closed a circuit is established and solenoid 26 is energized. The energization of solenoid 26 causes a clutch disengagement and a shift to direct drive in the transmission. The movement of shift rail 11 opens contacts 154 and 160 and deenergizes solenoid 26 thereby permitting clutch 12 to reengage.

The line 170 and contacts 166 and 167 are necessary for if the operator closed the accelerator switch 140 and before the completion of the shift should accidentally or through confusion step on the accelerator pedal 186 he would open the accelerator switch and interrupt the shift. The line 170 and contacts 166 and 167 provide a means for by-passing the accelerator switch after the shift has been initiated. It will be noted by referring to Fig. 4 that after the initial movement of the shift rail 11 from either of its end positions the switch 152 is closed by contacts 166 and 167 thereby connecting line 170 with line 169 and providing a circuit for energizing the solenoid which is independent of the accelerator switch 140.

The switches 110 and 124 are normally closed during the operation of the vehicle and the automatic control mechanism may operate until one of these switches is opened or until the selector switch 104 is opened. When the operator is operating the vehicle and the switch 104 is closed he has the ability to overrule the automatic control and operate the vehicle manually without being required to open switch 104. The very act of effecting a manual shift temporarily inactivates the automatic control system. By depressing the clutch pedal the operator opens switch 110 thereby breaking the circuit of the automatic control system. If the operator then moves shift rail 13 to effect a low or reverse drive the switch 124 is opened. This will keep the electric circuit deenergized as long as the vehicle is operated in the low or reverse drive. When the operator returns shift rail 13 to its neutral position the switch 124 is closed and as the operator reengages the clutch the clockwise rotation of pedal 40 closes switch 110. The automatic control mechanism is then operative and the governor 146, and rail switch 152 and accelerator switch 140 control the energization of solenoid valve 26.

If the operator desires to overrule the automatic control mechanism and manually move shift rail 11 instead of shift rail 13 the operation is similar and the depression of clutch pedal 40 opens switch 110 but in this instance the switch 124 remains closed. The fact that normal driving practice includes depressing the accelerator pedal 186 as the clutch 40 is released assures that by the time the switch 110 is closed the switch 140 is opened so that an uninterrupted period is provided in which the electrical control circuit is broken and manual operation of the clutch and transmission are possible.

I claim:

1. In a drive control mechanism for a motor vehicle having an engine, a variable speed ratio transmission and a clutch operatively connecting said engine and said transmission, vehicle driver operated clutch control mechanism for disengaging and engaging said clutch, vehicle driver operated control mechanism for changing the speed ratio drive in said transmission, automatic control mechanism for disengaging said clutch, changing the speed ratio drive in said transmission and engaging said clutch, and means associated with said driver operated clutch control mechanism for rendering said automatic control mechanism inoperative during the interval that said clutch is disengaged, said means including relatively movable operating parts at least one of which is operably moved as an incident to operation of said driver operated clutch control mechanism.

2. In a drive control mechanism for a motor vehicle having an engine, a variable speed ratio transmission and a clutch operatively connecting said engine and said transmission, vehicle driver operated clutch control mechanism for disengaging and engaging said clutch, vehicle driver operated control mechanism for changing the speed ratio drive in said transmission, electrically controlled means for actuating said clutch and varying the speed ratio drive in said transmission, a switch associated with said driver operated clutch control mechanism and said electrically controlled means and adapted to render said electrically controlled means inoperative as an incident to actuation of said driver operated clutch control mechanism.

3. In a drive mechanism for a motor vehicle having an engine provided with a throttle having a substantially closed position and a vehicle driver operated control for said throttle, a variable speed ratio transmission and a clutch operatively connecting said engine and said transmission, vehicle driver operated clutch control mechanism for disengaging and engaging said clutch, vehicle driver operated control mechanism for changing the speed ratio drive in said transmission, electrically controlled means for actuating said clutch and varying the speed ratio drive in said transmission, a switch associated with said driver operated control for the throttle adapted to prevent operation of said electrically controlled means at any time when said throttle was at other than said position, a switch associated with said driver operated clutch control mechanism and said electrically controlled means and adapted to render said electrically controlled means inoperative as an incident to actuation of said driver operated clutch control mechanism whereby the driver may if desired control the clutch and transmission speed ratio drive through said mechanisms independently of said electrically controlled means.

4. In a drive control mechanism for a motor vehicle having an engine provided with a throttle and a vehicle driver operated control for said throttle, a variable speed ratio transmission having a first and a second shift rail, a clutch operatively connecting said engine and said transmission, a first driver operated control mechanism for moving said shift rails to change the speed ratio drive in said transmission, a second driver operated control mechanism for disengaging and engaging said clutch, a solenoid, a source of electric energy, first means controlled by energization and deenergization of said solenoid to disengage said clutch, move said first shift rail to effect a change in transmission speed ratio drive and to reengage said clutch, an electrical circuit operatively connecting said source and said solenoid and including a plurality of switches arranged in series, said plurality of switches including a first switch associated with said second driver operated control mechanism and adapted to be closed only when said second driver operated control mechanism is in the position corresponding to engagement of said clutch, a second switch associated with said driver operated throttle control and adapted to be closed only when said throttle is substantially closed, a third switch associated with said second shift rail and adapted to be open when said second shift rail is in other than a neutral position and the transmission drive components associated therewith are operative whereby said solenoid may be deenergized by driver control when the driver actuates said second driver operated control mechanism to disengage said clutch, actuates said driver operated throttle control to effect an opening movement of said throttle or moves said second shift rail out of its neutral position.

5. In a drive control mechanism for a motor vehicle having an engine provided with a throttle and a vehicle driver operated control for said throttle, a variable speed ratio transmission having a first and a second shift rail, a clutch operatively connecting said engine and said transmission, a first driver operated control mechanism for moving said shift rails to change the speed ratio drive in said transmission, a second driver operated control mechanism for disengaging and engaging said clutch, a solenoid, a source of electric energy, first means controlled by energization and deenergization of said solenoid to disengage said clutch, move said first shift rail to effect a change in transmission speed ratio drive and to reengage said clutch, a vehicle speed responsive governor, an electrical circuit operatively connecting said source and said solenoid and including a plurality of switches arranged in series, said plurality of switches including a first switch associated with said second driver operated control mechanism and adapted to be closed only when said second driver operated control mechanism is in the position corresponding to engagement of said clutch, a second switch associated with said driver operated throttle control and adapted to be closed only when said throttle is substantially closed, a third switch associated with said second shift rail and adapted to be open when said second shift rail is in other than a neutral position and the transmission drive components associated therewith are operative, a governor controlled fourth switch having a first contact and a second contact, means associated with said governor and said governor controlled switch and adapted to operatively connect said first contact to said circuit below a predetermined vehicle speed and to operatively connect said second contact to said circuit above said predetermined vehicle speed, a fifth switch associated with said first shift rail having a first contact operatively connected to the first contact of said governor controlled switch and a second contact operatively connected to the second contact of said governor controlled switch, means associated with said first shift rail and adapted to electrically connect said first contact of said fifth switch with said solenoid when said first shift rail is moved in one direction and to electrically connect said second contact of said fifth switch with said solenoid when said first shift rail is moved in another direction, said first switch being adapted to deenergize said electrical circuit to accommodate a driver controlled actuation of said first and second mechanisms independently of said first means and said second switch being adapted to prevent interruption by said first means of the speed ratio drive selected by the driver while said throttle is maintained in a partially open position as an incident to vehicle operation.

6. Control means adapted to control the operation of the change speed transmission and friction clutch of the power plant of an automotive vehicle provided with a shift lever and a clutch pedal, said means comprising a single acting fluid pressure operated motor operably connected to the transmission and clutch and operable, when the motor is energized, to successively disengage the clutch and operate the transmission and to subsequently effect a reengagement of the clutch when the motor is deenergized, force transmitting means, interconnecting the transmission, clutch and power element of the motor, force transmitting means interconnecting a portion of the aforementioned force transmitting means and the shift lever and operable to effect a manual operation of a part of the transmission, valve means for controlling the operation of said motor, and electrical means for controlling the operation of said valve means to effect a cycle of power operations of the mechanism to successively disengage the clutch, operate the transmission and re-engage the clutch, said electrical means including a clutch pedal operated switch operable to disable the electrical means when said pedal is substantially depressed and thereby make possible a manual operation of the transmission.

7. Control means adapted to control the operation of the change speed transmission and friction clutch of the power plant of an automotive vehicle provided with a shift lever and a clutch pedal, said means comprising a single acting fluid pressure operated motor operably connected to the transmission and clutch and operable, when the motor is energized, to successively disengage the clutch and operate the transmission and to subsequently effect a re-engagement of the clutch when the motor is de-energized, force transmitting means, including a direction changing mechanism interconnecting the transmission, clutch and power element of the motor, force transmitting means interconnecting a portion of the aforementioned force transmitting means and the shift lever and operable to effect a manual operation of a part of the transmission, a three way valve for controlling the operation of said motor, and electrical means for controlling the operation of said valve to effect a cycle of power operations of the mechanism to successively disengage the clutch, operate the transmission and re-engage the clutch, said electrical means including a clutch pedal operated switch operable to disable the electrical means when said pedal is substantially depressed and thereby make possible a manual operation of the transmission.

8. Manually and power operated control means adapted to control the operation of the transmission and the friction clutch of the power plant of an automotive vehicle including an accelerator and a clutch pedal, said means comprising a pressure differential operated motor operably connected to the transmission and clutch and operable to successively disengage the clutch, operate the transmission and re-engage the clutch, valve means for controlling the operation of said motor, and electrical means for controlling the operation of the valve means to successively effect an energization of the motor and a de-energization thereof, said electrical means including a clutch pedal operated switch which is closed when said pedal is in its released position and opened when said pedal is depressed a substantial amount, an accelerator operated switch which is closed when the accelerator is released said switch being electrically connected in series with the clutch pedal operated switch, a governor operated single pole double throw switch having its movable contact electrically connected in series with the accelerator operated switch, a motor operated selector switch mechanism including three fixed contacts and a movable contact, electrical means interconnecting one of the fixed contacts with one of the fixed contacts of the governor operated switch, electrical means interconnecting a second of the three fixed contacts with another of the fixed contacts of the governor operated switch, electrical means interconnecting the third fixed contact of the motor operated switch with the clutch pedal operated switch, a grounded valve controlling solenoid, and electrical means interconnecting said solenoid with the movable contact of the motor operated switch.

9. Manually and power operated control means adapted to control the operation of the three speeds forward and reverse transmission and the friction clutch of the power plant of an automotive vehicle including an accelerator and a clutch pedal, said means comprising a pressure differential operated motor operably connected to the transmission and clutch and operable to successively disengage the clutch, operate the transmission and re-engage the clutch, valve means for controlling the operation of said motor, and electrical means for controlling the operation of the valve means to successively effect an energization of the motor and a de-energization thereof, said electrical means including a clutch pedal operated switch, an accelerator operated switch, a governor operated single pole double throw switch, electrical means interconnecting the movable contact of the latter switch and the aforementioned two switches to provide a series connection of said three switches, a motor operated selector switch mechanism including three fixed contacts and a movable contact, electrical means interconnecting one of the fixed contacts with one of the fixed contacts of the governor operated switch, electrical means interconnecting a second of the three fixed contacts with another of the fixed contacts of the governor operated switch, electrical means interconnecting the third fixed contact of the motor operated switch with the clutch pedal operated switch, a valve controlling grounded solenoid, and electrical means interconnecting said solenoid with the movable contact of the motor operated switch.

10. Manually and power operated control means adapted to control the operation of the three speeds forward and reverse transmission and the friction clutch of the power plant of an automotive vehicle including an accelerator and a clutch pedal, said means comprising a pressure differential operated motor operably connected to the transmission and clutch and operable to successively disengage the clutch, operate the transmission and re-engage the clutch, a three way valve for controlling the operation of said motor, and electrical means for controlling the operation of the valve means to successively effect an energization of the motor and a de-energization thereof, said electrical means including a clutch pedal operated switch which is closed when said pedal is in its released position and opened when said pedal is depressed a substantial amount, an accelerator operated switch which is closed when the accelerator is released, said switch being electrically connected in series with the clutch pedal operated switch, a governor operated single pole double throw switch having its movable contact electrically connected in series with the accelerator operated switch, a motor operated selector switch mechanism including three fixed contacts and a movable contact, electrical means interconnecting one of the fixed contacts with one of the fixed contacts of the governor operated switch, electrical means interconnecting a second of the three fixed contacts with another of the fixed contacts of the governor operated switch, electrical means interconnecting the third fixed contact of the motor operated switch with the clutch pedal operated switch, a grounded valve controlling solenoid, and electrical means interconnecting said solenoid with the movable contact of the motor operated switch.

MAURICE C. ROBINSON.

REFERENCES CITED

The following references are of record in the file of this patent:

UNITED STATES PATENTS

| Number | Name | Date |
|---|---|---|
| 1,864,103 | Tenbrook | June 21, 1932 |
| 2,187,824 | Britton | Jan. 23, 1940 |
| 2,208,384 | Morrison | July 16, 1940 |
| 2,208,828 | Adams | July 23, 1940 |
| 2,222,913 | Pescara | Nov. 26, 1940 |
| 2,287,272 | Price et al. | June 23, 1942 |
| 2,351,067 | Randol | June 13, 1944 |
| 2,434,717 | Randol | Jan. 20, 1948 |
| 2,492,923 | Moore et al. | Dec. 27, 1949 |
| 2,514,002 | Long | July 4, 1950 |